United States Patent [19]

Furnes

[11] Patent Number: 5,333,924
[45] Date of Patent: Aug. 2, 1994

[54] APPARATUS FOR MOVING BARRELS

[76] Inventor: Reidar Furnes, Boks 131, N-6036 Mauseidvåg, Norway

[21] Appl. No.: 989,798

[22] Filed: Dec. 10, 1992

Related U.S. Application Data

[63] Continuation-in-part of the PCT/N091/00083, Jun. 12, 1991.

[30] Foreign Application Priority Data

Jun. 13, 1990 [NO] Norway .................. 902618

[51] Int. Cl.5 ............................................. B65G 7/12
[52] U.S. Cl. ........................................ 294/15; 294/92
[58] Field of Search .................. 294/4, 15–17, 294/27.1, 31.1, 90, 92, 62; 254/120, 121, 131, 133 R

[56] References Cited

U.S. PATENT DOCUMENTS

| | | | |
|---|---|---|---|
| 417,578 | 12/1889 | McNeill et al. | 294/15 |
| 1,285,926 | 11/1918 | Bussler | 294/15 |
| 1,401,046 | 12/1921 | Clymer | 294/15 |
| 1,455,273 | 5/1923 | Sheen | 294/15 |
| 1,657,100 | 1/1928 | Wilson et al. | 294/15 |
| 1,879,532 | 9/1932 | Schlebecker | 294/15 |
| 1,973,568 | 9/1934 | Keith | 294/27.1 |
| 2,244,988 | 6/1941 | Fuller | 294/15 |
| 2,262,273 | 11/1941 | Ferrara | 294/27.1 |
| 2,416,016 | 2/1947 | McKenna | 294/15 |
| 2,605,128 | 7/1952 | Schneider | 294/15 |
| 2,619,372 | 11/1952 | Gardner | 294/92 |
| 2,652,278 | 9/1953 | Allen | 294/15 |
| 2,784,996 | 3/1957 | Schaefer | 294/27.1 |
| 3,215,831 | 1/1967 | Trimble | 294/15 X |
| 3,333,883 | 8/1967 | Kikuchi | 294/90 |
| 4,078,839 | 3/1978 | Chambers et al. | 294/31.1 |
| 4,433,864 | 2/1984 | Byrd | 294/27.1 |
| 4,982,987 | 1/1991 | Riggins et al. | 294/62 |

FOREIGN PATENT DOCUMENTS

| | | | |
|---|---|---|---|
| 225180 | 10/1959 | Australia | 294/15 |
| 196580 | 3/1958 | Austria | 294/92 |
| 935718 | 11/1955 | Fed. Rep. of Germany | 294/15 |
| 1191948 | 4/1965 | Fed. Rep. of Germany | |
| 36090 | 3/1912 | Sweden . | |
| 377686 | 7/1975 | Sweden . | |
| 448478 | 8/1986 | Sweden . | |
| 449215 | 4/1987 | Sweden . | |
| 342493 | 12/1959 | Switzerland | 294/15 |
| 481000 | 12/1969 | Switzerland | 294/15 |
| 857839 | 1/1961 | United Kingdom | 294/15 |

Primary Examiner—Johnny D. Cherry
Attorney, Agent, or Firm—Nils H. Ljungman & Associates

[57] ABSTRACT

Apparatus for loosening and moving cylindrical containers, such as barrels, having edge flanges. The apparatus includes a shaft-like handle having two gripping elements at one end thereof, whereby the gripping elements are connected to the handle in such a way that there is a space which fits over the edge flange of the container. One of the two gripping elements, intended for being fitted on the inner side of the flange when in use, has a gripping edge facing the space between the two gripping elements. The gripping edge is curved in accordance with the internal curvature of the flange and preferably extends over a circumference of about 5 or more degrees.

18 Claims, 1 Drawing Sheet

APPARATUS FOR MOVING BARRELS

CONTINUING APPLICATION DATA

This application is a continuation-in-part application of International Application No. PCT/NO91/00083 filed on Jun. 12, 1991, which claims priority from Norwegian Patent Application No. P 90 26 18 filed on Jun. 13, 1990.

BACKGROUND OF THE INVENTION

1. Field of the Invention

The invention comprises an apparatus for moving oil barrels and similar flanged containers.

2. Background Information

In connection with the transport and storage of standing oil barrels, it is normal that the barrels are pressed so close together that they can be difficult to separate. This is particularly a problem with the transport of oil barrels on road vehicles, where these barrels have a tendency to get wedged and are difficult to move manually.

OBJECT OF THE INVENTION

The main objective of the invention is to devise an apparatus that is designed to loosen and move oil barrels manually. The apparatus must be easy to use and can be used by one person without undue strain.

SUMMARY OF THE INVENTION

The invention is essentially embodied by a gripping organ comprising two elements, wherein the gripping elements are connected to the handle such that there is a space between the gripping elements. The space is preferably configured so as to fit over the edge flange of the container. One of the two gripping elements, designed to be fitted to the inner side of the flange when in use, is preferably designed with a gripping edge facing the space and is preferably curved in accordance with the internal curvature of the flange. Preferably, the gripping edge extends over a circumference of about 5 degrees or more.

The invention has made it feasible to loosen and move full oil barrels and similar containers in a straightforward easy manner. Consequently, this has realized a versatile and reasonably-priced apparatus that can be kept ready for use on transport vehicles, especially trucks, at warehouses and other places where there is a need for loosening and moving standing containers with flanged edges.

BRIEF DESCRIPTION OF THE DRAWINGS

The invention is described in more detail below with reference to drawings, where FIG. 1 shows a perspective sketch of an apparatus in accordance with the invention attached to an oil barrel, while

DESCRIPTION OF THE PREFERRED EMBODIMENT

Figure 1:
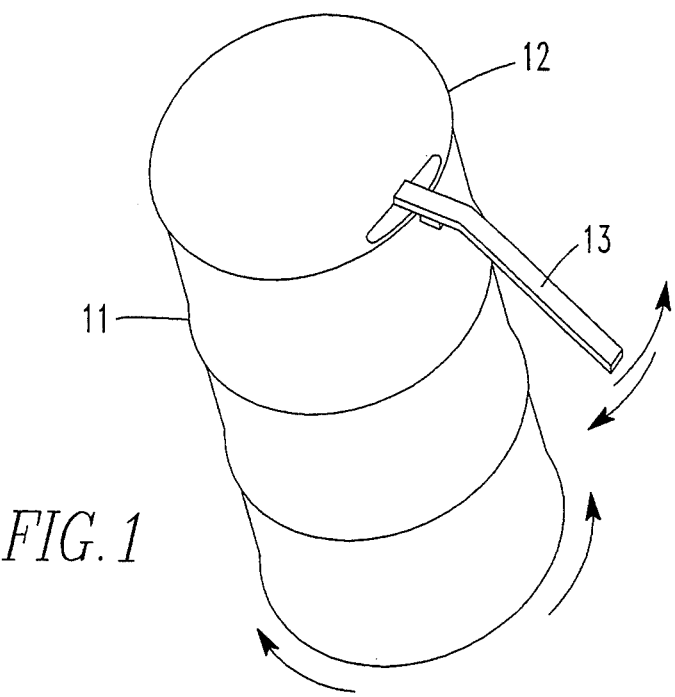

FIG. 1 shows a cylindrical oil barrel 11 with an edge flange 12. At the end of the oil barrel 11, a tool 13 is positioned that is described in more detail below and which is shown in more detail in FIG. 2.

The tool 13 has a grip head 14 that is equipped with a shaft-like handle 15.

The grip head 14 comprises a metal lug 16 that is placed along part of the flange 12, in that it is curved with an equivalent radius as the flange in the gripping area. The lug 16, which is curved so that the gripping edge extends over a circumference angle of 5 degrees or more, has a handle 15 on one side, which has an inner stem 15A and an outer gripping part 15B. The two parts 15A and 15B bend on a lateral axis so that they meet at an angle of under 180 degrees, for example, 150 degrees, with the opening towards the lug 16.

Under the stem 15A, outside the lug 16, there is a counterpart 17 to the lug 16, which is fitted with a claw 18 facing the lug 16. This means that between the claw 18 and the lug 16 there is a gap 19 which fits over the flange 12 to allow a firm grip.

The tool shown in the example can be manufactured from many components welded together. In an alternative design the tool can be punched out of a metal sheet where the handle 15 has a channel profile with the opening towards the lug 16 and the counterpart 17, in that these parts are punched as protruding parts, possibly with reinforcement given to the lug 16.

In accordance with the present invention, the claw 18 may comprise a short lug which is welded to the handle 15 or forged in the material of the handle, to protrude toward the lug 16, leaving an intervening space. The intervening space preferably corresponds to the width of the flange 12 of the container to be handled, with some tolerance.

Figure 2:
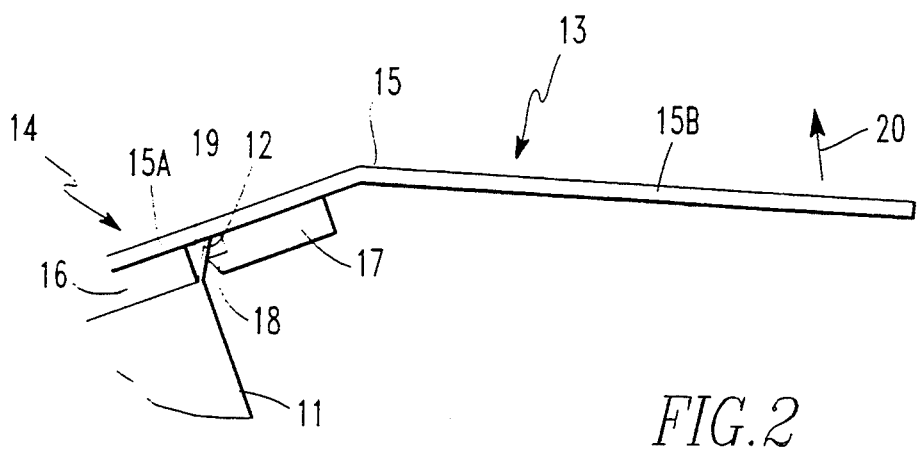
FIG. 2 shows a lateral perspective of the apparatus in FIG. 1 in the attached position.

On the whole, claw 18 is preferably shaped and configured so as to be able to adequately provide support for lifting barrel 11 at edge flange 12. Indeed, if, as shown in FIG. 2, flange 12 of barrel 11 is flanged, at a given slope, away from the central axis of barrel 11, then claw 18 is preferably configured to appropriately attack the underside of the slope defined by flange 12 in order to adequately provide the requisite lifting force on flange 12.

The claw 18 may preferably be shaped in the manner of a dent or a block with a rectangular end. The claw 18 may also be preferably embodied by a protrusion jutting outwardly, from counterpart lug 17, in a direction towards lug 16, in the manner particularly illustrated in FIG. 2. As such, the protrusion embodying claw 18 may preferably be defined, in the longitudinal direction of tool 13, by converging planar surfaces. An upper one of the planar surfaces may preferably be oriented generally in parallel with inner stem 15A, and a lower one of the planar surfaces may preferably be oriented at a slope with respect to inner stem 15a, such that the upper and lower planar surfaces may preferably meet at an acute angle, the vertex of which acute angle is preferably pointed generally towards lug 16. The slope of the lower planar surface may preferably be configured to be approximately normal to the slope of flange 12 when tool 13 is in its gripping position, as in FIG. 2.

Generally, there is no particular demand as to the width of claw 18, but, preferably, said width may be approximately equal to the width of the corresponding portion of handle 15.

It is generally desirable that claw 18 be manufactured of a material capable of withstanding the impact of several years of use. Such a material may include, for example, high quality steel. It should be understood that such a material should also preferably be employed in manufacturing lug 16.

The apparatus in accordance with the invention is placed over the flange 12 and can then be used to twist an oil barrel on its axis or to pitch the oil barrel on the same axis, possibly as a combination of a number of movements. To do this the handle 15B has to be lifted as shown by arrow 20. Because of the bend, the tool will have an advantageous working position with a lower and better ergonomically-suited gripping area.

Thus, a method of moving a barrel, according to the present invention is essentially embodied by providing a tool 13 in accordance with that described heretofore, positioning the tool 13 adjacent the flange portion 12 of the barrel 11, accommodating the flange portion 12 of the barrel 11 within the space 19, lifting the handle 15 of the tool 13 in a generally vertical direction to effect simultaneous lifting of a portion of the barrel 11 via the flange portion 12 of the barrel 11, and, subsequent to lifting the handle 15 of the gripping apparatus, moving the barrel 11 to the desired position.

It should be understood that, within the scope of the present invention, the apparatus and method described heretofore need not necessarily be applied to barrels. Essentially, the present invention may be applied to any of a wide variety of generally cylindrical containers having edge flanges.

One feature of the invention resides broadly in apparatus for loosening and moving what are generally cylindrical containers with edge flanges, which are stored and possibly transported in a standing position, where there is a shaft-like handle that has a gripping organ at one end that can be attached over the flange of a container, characterized by the gripping organ comprising two elements which are connected to the handle so that between them there is a space which fits over the edge flange of the container, and where one of the two elements, that is designed to be fitted to the inner side of the flange when in use is designed with a gripping edge facing the space, and which is curved in accordance with the internal curvature of the flange, and where this gripping edge extends over a circumference of 5 degrees or more.

Another feature of the invention resides broadly in apparatus characterized by the gripping element that is designed for external gripping is shaped like a claw in order to grip under the edge of the flange.

Yet another feature of the invention resides broadly in apparatus characterized by a shaft-like handle that is bent on an axis at right-angles to the main direction of the handle, so that there is an angle of about 150 degrees facing the gripping organs.

All, or substantially all, of the components and methods of the various embodiments may be used in any combination with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for moving a cylindrical container, such as a barrel, from an original, first position to a second position, the cylindrical container comprising an upper horizontal surface and a flange portion disposed about the upper horizontal surface, said apparatus comprising:
   a generally elongated handle portion, said handle portion defining a longitudinal extent along the length thereof;
   a first gripping element and a second gripping element each being mounted on said handle portion;
   said first gripping element and said second gripping element being for gripping the flange portion of the cylindrical container to move the cylindrical container;
   said first gripping element and said second gripping element generally being disposed in a spaced-apart relation with one another along the longitudinal extent of the handle portion;
   said first gripping element and said second gripping element defining a space therebetween for accommodating the flange portion of the cylindrical container therewithin, to grip the flange portion of the cylindrical container to move the cylindrical container;
   the upper horizontal surface of the cylindrical container defining a plane;
   said first gripping element and said second gripping element being aligned so as to be aligned in a plane parallel to and substantially adjacent the plane defined by the upper horizontal surface of the cylindrical container, to grip the flange portion of the cylindrical container to move the cylindrical container;
   said first gripping element, said second gripping element and said handle portion all being substantially immovable with respect to one another;
   said first gripping element comprising a gripping edge, said gripping edge:
      being adjacent the space defined between said first gripping element and said second gripping element;
   facing said second gripping element; and
   being for facing the flange portion of the cylindrical container to grip the flange portion of the cylindrical container, to move the cylindrical container; and
   said gripping edge being curved to engage the flange portion
   of the cylindrical container.

2. The apparatus according to claim 1, wherein the upper horizontal surface is generally circular and has a plurality of radii, and further wherein:
   said first gripping element and said second gripping element are aligned so as to be aligned along a radius of the upper horizontal surface of the cylindrical container, to grip the flange portion of the cylindrical container to move the cylindrical container.

3. The apparatus according to claim 2, wherein said second gripping element is for applying an upward force directly on an underside of the flange portion of the cylindrical container, to move the cylindrical container, the underside of the flange portion of the cylindrical container being disposed away from the upper horizontal surface of the cylindrical container.

4. The apparatus according to claim 3, wherein the cylindrical container has a central longitudinal axis defined therethrough, and further wherein:

said first gripping element and said second gripping element are for:

applying an upward force to the cylindrical container to tilt the cylindrical container, and turning the cylindrical container about its central longitudinal axis, to move the cylindrical container from the first position to the second position.

5. The apparatus according to claim 4, wherein:

said handle portion comprises a first portion and a second portion;

said first portion having an underside;

said first portion of said handle portion having said first gripping element and said second gripping element mounted on said underside of said first portion; and said second portion of said handle portion being bent with respect to said first portion, in a direction towards said underside of said first portion.

6. The apparatus according to claim 5, wherein the flange portion has a given contour, and further wherein:

said gripping edge has a contour corresponding to the contour of the flange portion of the cylindrical container.

7. The apparatus according to claim 6, wherein said apparatus consists of said first gripping element, said second gripping element and said handle portion.

8. The apparatus according to claim 7, wherein said second portion of said handle portion is bent at an angle of less than 180° with respect to said first portion of said handle portion.

9. The apparatus according to claim 8, wherein said gripping edge of said first gripping element describes an arc length of at least 5 degrees.

10. The apparatus according to claim 9, wherein said second portion of said handle portion is bent at an angle of about 150° with respect to said first portion of said handle portion.

11. The apparatus according to claim 9, wherein the flange portion has a thickness and is sloped at an obtuse angle with respect to the upper horizontal surface of the cylindrical container, and further wherein:

said space defined between said first gripping element and said second gripping element corresponds, with some tolerance, to the thickness of the flange portion of the cylindrical portion;

said second gripping element comprises a pair of converging planar surfaces;

a first of said pair of converging planar surfaces is disposed parallel to said first portion of said handle portion;

a second of said pair of converging planar surfaces is oriented at an angle which is acute with respect to said first converging planar surface, the angle for being normal with respect to the slope of the flange portion of the cylindrical container;

said first and second converging planar surfaces meeting at a vertex, said vertex being disposed towards said first gripping element and adjacent to said space defined between said first gripping element and said second gripping element;

said first portion of said handle portion having a width defined in a direction perpendicular to the longitudinal extent of said handle portion;

said second gripping element having a width defined in a direction perpendicular to the longitudinal extent of said handle portion; and the width of said first portion of said handle portion being approximately equal to the width of said second gripping element.

12. The apparatus according to claim 4, wherein said apparatus consists of said first gripping element, said second gripping element and said handle portion.

13. The apparatus according to claim 12, wherein the flange portion has a given contour, and further wherein:

said first gripping element comprises a gripping edge, said gripping edge:

is adjacent the space defined between said first gripping element and said second gripping element;

faces said second gripping element; and is for facing the flange portion of the cylindrical container to grip the flange portion of the cylindrical container, to move the cylindrical container; and said gripping edge has a contour corresponding to the contour of the flange portion of the cylindrical container.

14. The apparatus according to claim 13, wherein:

said handle portion comprises a first portion and a second portion;

said first portion having an underside;

said first portion of said handle portion having said first gripping element and said second gripping element mounted on said underside of said first portion; and said second portion of said handle portion being bent with respect to said first portion, in a direction towards said underside of said first portion.

15. The apparatus according to claim 14, wherein said second portion of said handle portion is bent at an angle of less than 180° with respect to said first portion of said handle portion.

16. The apparatus according to claim 15, wherein said gripping edge of said first gripping element is curved and describes an arc length of at least 5 degrees.

17. The apparatus according to claim 16, wherein said second portion of said handle portion is bent at an angle of about 150° with respect to said first portion of said handle portion.

18. The apparatus according to claim 17, wherein the flange portion has a thickness and is sloped at an obtuse angle with respect to the upper horizontal surface of the cylindrical container, and further wherein:

said space defined between said first gripping element and said second gripping element corresponds, with some tolerance, to the thickness of the flange portion of the cylindrical portion;

said second gripping element comprises a pair of converging planar surfaces;

a first of said pair of converging planar surfaces is disposed parallel to said first portion of said handle portion;

a second of said pair of converging planar surfaces is oriented at an angle which is acute with respect to said first converging planar surface, the angle for being normal with respect to the slope of the flange portion of the cylindrical container;

said first and second converging planar surfaces meeting at a vertex, said vertex being disposed towards said first gripping element and adjacent to said space defined between said first gripping element and said second gripping element;

said first portion of said handle portion having a width defined in a direction perpendicular to the longitudinal extent of said handle portion;

said second gripping element having a width defined in a direction perpendicular to the longitudinal extent of said handle portion; and the width of said first portion of said handle portion being approximately equal to the width of said second gripping element.

* * * * *